United States Patent
Hochdorf et al.

(10) Patent No.: US 7,925,251 B2
(45) Date of Patent: Apr. 12, 2011

(54) AUTOMATIC DELAY CALIBRATION AND TRACKING FOR ULTRA-WIDEBAND ANTENNA ARRAY

(75) Inventors: Eyal Hochdorf, Tel Aviv (IL); Ran Timar, Kfar-Saba (IL); Amir Beeri, Zoran (IL); David Gazelle, Kfar-Hess (IL)

(73) Assignee: Camero-Tech Ltd., Netanya (IL)

( * ) Notice: Subject to any disclaimer, the term of this patent is extended or adjusted under 35 U.S.C. 154(b) by 217 days.

(21) Appl. No.: 12/164,752

(22) Filed: Jun. 30, 2008

(65) Prior Publication Data

US 2008/0261536 A1    Oct. 23, 2008

Related U.S. Application Data

(63) Continuation of application No. PCT/IL2006/001502, filed on Dec. 28, 2006.

(30) Foreign Application Priority Data

Dec. 28, 2005  (IL) ........................................ 172864

(51) Int. Cl.
*H04W 24/00* (2009.01)
*H04B 17/00* (2006.01)

(52) U.S. Cl. .................. 455/423; 455/67.11; 455/115.1; 455/226.1; 342/172; 342/173; 342/174

(58) Field of Classification Search .................. 455/423, 455/67.11, 115.1, 226.1; 342/172, 173, 174
See application file for complete search history.

(56) References Cited

U.S. PATENT DOCUMENTS

| | | | |
|---|---|---|---|
| 4,806,935 A | 2/1989 | Fosket et al. | |
| 5,160,933 A * | 11/1992 | Hager | 342/174 |
| 5,313,210 A | 5/1994 | Gail | |
| 5,412,414 A | 5/1995 | Ast et al. | |
| 6,137,343 A | 10/2000 | Matano | |
| 6,157,343 A * | 12/2000 | Andersson et al. | 342/371 |
| 6,166,691 A * | 12/2000 | Lindqvist | 342/465 |
| 6,246,363 B1 | 6/2001 | Yung et al. | |
| 6,339,399 B1 * | 1/2002 | Andersson et al. | 342/372 |
| 7,075,478 B2 * | 7/2006 | Hager et al. | 342/120 |
| 2004/0004905 A1 | 1/2004 | Lyon et al. | |
| 2005/0140546 A1 | 6/2005 | Park et al. | |
| 2006/0227040 A1 | 10/2006 | Christian et al. | |

FOREIGN PATENT DOCUMENTS

WO    WO 99/19744    4/1999

OTHER PUBLICATIONS

Ascarrunz F. et al., "A Delay Calibration System for Two-Way Satellite Time and Frequency Transfer," 1998 IEEE International Frequency Control Symposium, May 27, 1998, pp. 250-253.

* cited by examiner

*Primary Examiner* — Wen W Huang
(74) *Attorney, Agent, or Firm* — Oliff & Berridge, PLC

(57) ABSTRACT

A method for determining changes in internal delays of RF units, the RF units including a plurality of receivers and transmitters. The method includes providing initial direct signals' time of arrivals of the RF units initial internal delays of the RF units. Following this, each transmitter transmitting a direct signal, and the real-time direct signal's time of arrivals of the RF units, are measured. Then, changes in internal delays of the RF units are calculated based on the real-time direct signals' time of arrivals and initial direct signals' time of arrivals. And finally, real-time internal delays of the RF units are calculated based on the changes in internal delays and the initial internal delays of the RF units.

11 Claims, 4 Drawing Sheets

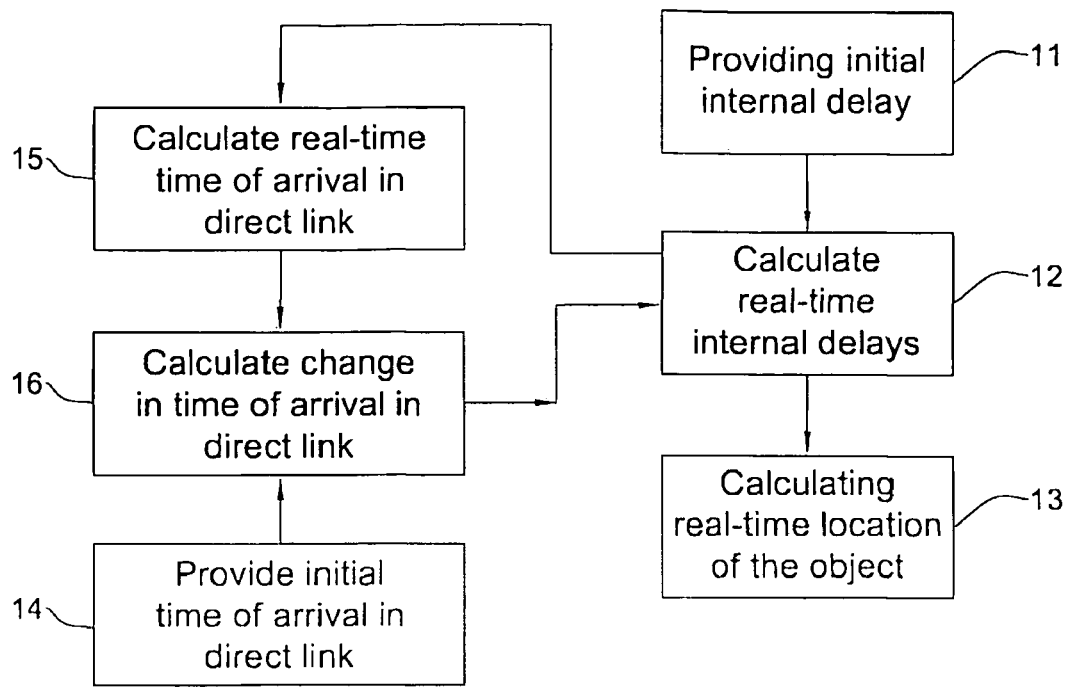
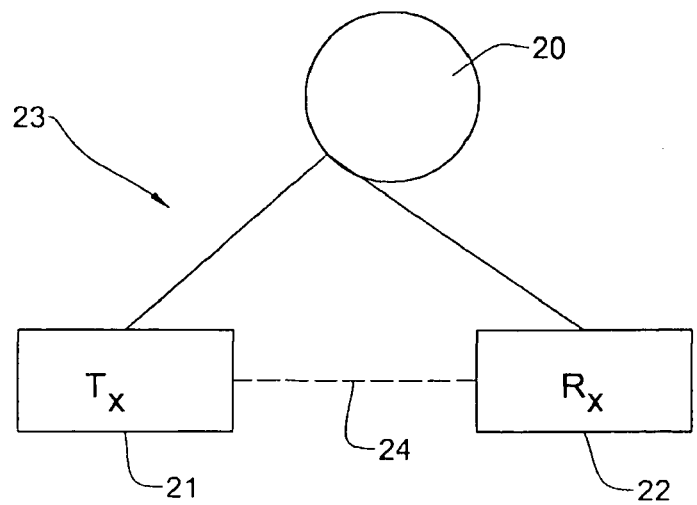
FIG. 1
FIG. 2

AUTOMATIC DELAY CALIBRATION AND TRACKING FOR ULTRA-WIDEBAND ANTENNA ARRAY

CROSS REFERENCE TO RELATED APPLICATIONS

This application claims the benefit of an Israeli Patent Application No. IL 172864, titled "Automatic Delay Calibration and Tracking for Ultra-wideband Antenna Array" and filed on Dec. 28, 2005, which is hereby incorporated by reference herein.

FIELD OF THE INVENTION

This invention relates to timing varying calculations of internal delays in transmitters and receivers.

BACKGROUND OF THE INVENTION

One of the main tasks of a radar system is to be able to determine the location of a reflecting object relative to a radar's origin. The measured delay between the initiation of a transmit signal and the acceptance of the received signal contains, besides the travel time of the signal from the transmitter to the reflecting object and back to the receiver, also an internal delay of both the transmitter and receiver.

List of Related Art

U.S. Pat. No. 5,412,414 discloses a self monitoring/calibrating phased array radar in which the operating path for transmission and the operating path for reception may be monitored/calibrated by the addition of a corporate calibration network coupled at the plural end to the antenna elements, and at the singular end to the exciter/receiver, and switching means to selectively route the monitoring/calibrating signal derived from the exciter in a transmit path to calibration path sequence or in a calibration path to receive path sequence. In one embodiment of the invention, a phase shifter common to transmit and receive paths is adjustable in increments under active logical control for calibration, while power and gain performance is monitored but not actively controlled. A novel T/R sub-assembly houses the operating electronics for four antenna elements in the form of four T/R modules with a one to four divider network in the transmit/receive path and in the calibration path. The four antenna elements are an integral part of the T/R sub-assembly.

U.S. Pat. No. 6,246,363 discloses a method and system for using two-way ranging navigation to accurately determine the range along the path from source to destination by measuring the time delay during round-trip communication via satellite. The two-way ranging navigation measurements are used as calibration references, thereby improving the positioning accuracy of GPS. She system includes GPS and a two-way ranging navigation system for taking position measurements of a target. A correction factor is determined as a function of the measurements and the GPS position is adjusted by the correction factor. The method for calibrating GPS using two-way ranging navigation involves taking a two-way ranging navigation measurement and a GPS measurement of a target, determining a correction factor as a function of the measurements, and correcting the GPS position by taking a second GPS measurement and adjusting it by the correction factor.

U.S. Pat. No. 6,339,399 discloses a method and a system for calibrating the reception and transmission of an antenna array for use in a cellular communication system. The calibration of the reception of the antenna array is performed by injecting a single calibration signal into each of a number of receiving antenna sections, in parallel. The signals are collected after having passed receiving components that might have distorted the phase and amplitude. Correction factors are generated and applied to received signals. The calibration of the transmission of the antenna array is performed in a similar way. A single calibration signal is generated and injected into each of a number of transmitting antenna sections, one at a time. The signals are collected, one at a time, after having passed transmitting components that might have distorted the phase and amplitude. Correction factors are generated and applied to signals that are to be transmitted.

U.S. Pat. No. 6,157,343 discloses a method and a system for calibrating the reception and transmission of an antenna array for use in a cellular communication system. The calibration of the reception of the antenna array is performed by injecting a single calibration signal into each of a number of receiving antenna sections, in parallel. The signals are collected after having passed receiving components that might have distorted the phase and amplitude. Correction factors are generated and applied to received signals. The calibration of the transmission of the antenna array is performed in a similar way. A single calibration signal is generated and injected into each of a number of transmitting antenna sections, one at a time. The signals are collected, one at a time, after having passed transmitting components that might have distorted the phase and amplitude. Correction factors are generated and applied to signals that are to be transmitted.

U.S. Pat. No. 5,313,210 discloses a process for mapping a region of interest using polarimetric radar signals. The process provides for the polarimetric calibration of polarized signal data to account for distortions arising from cross-talk and channel imbalance during signal transmission and/or reception. Moreover, the process also can be used to correct ionospheric signal distortions of polarized signals with low frequencies prone to Faraday rotations upon encountering the ionosphere. Such calibrations are accomplished with a reduced number of, typically ground-based, signal reflection devices used for calibrating the polarimetric signals to compensate for the above distortions.

The internal delays of the transmitter/receiver may vary over time due to ambient conditions such as temperature and accordingly there is a need in the art to calculate the time varying delays of transmitters and receivers, during the operation of the radar system.

There is still further need in the art to calibrate the operation of transmitter/receiver based on the calculated delay(s).

In the specific case of Ultra-wide-Band systems, especially for "Through the Wall Radar Systems", it is required to be able to detect object's position with very high precision of, say, millimeters. To this end, there is a need to calculate the internal delays of the transmitters/receivers with very high precision in order to determine an object's location with accuracy.

SUMMARY OF THE INVENTION

The invention provides for a method determining changes in internal delays of RF units, the RF units include at least one receiver and at least one transmitter, comprising:

(a) providing initial direct signals' time of arrivals of the RF units and providing initial internal delays of the RF units;

(b) each transmitter transmitting a direct signal and measuring real-time direct signal's time of arrivals of the RF units;

(c) calculating changes in internal delays of the RF units based on the real-time direct signals' time of arrivals and initial direct signals' time of arrivals;

(d) calculating real-time internal delays of the RF units based on said changes in internal delays and said initial internal delays of the RF units.

The invention further provides for a method for determining changes in internal delays of RF units, the RF units include at least one receiver and at least one transmitter, comprising:

(a) measuring calibration timings of direct signal transmissions (b) measuring real-time timings of direct signal transmissions; and (c) calculating real-time internal delays of the RF units based on changes between the measured real-time timings and the measured calibrated timings.

The invention further provides for a system for determining changes in internal delays of RF units, the system includes RF units consisting of at least one receiver and at least one transmitter and a computer system including storage coupled to the RF units, the system comprising:

the computer system being configured to provide initial direct signals' time of arrivals of the RF units and initial internal delays of the RF units;

the computer system being configured to command each transmitter to transmit a direct signal and provide real-time direct signal's time of arrivals;

the computer system being configured to calculate changes in internal delays of the RF units based on the real-time direct signals' time of arrivals and initial direct signals' time of arrivals;

the computer system being configured to calculate real-time internal delays of the RF units based on said changes in internal delays and said initial internal delays of the RF units.

The invention further includes a computer program product including a storage storing computer code portions for performing the following method steps that include:

(a) providing initial direct signals' time of arrivals of the RF units and providing initial internal delays of the RF units;

(b) providing real-time direct signal's time of arrivals of the RF units;

(c) calculating changes in internal delays of the RF units based on the real-time direct signals' time of arrivals and initial direct signals' time of arrivals;

(d) calculating real-time internal delays of the RF units based on said changes in internal delays and said initial internal delays of the RF units.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 1 illustrates a general sequence of operation, in accordance with certain embodiments of the invention;

FIG. 2 illustrates schematically an indirect link between a transmitter and receiver;

DETAILED DESCRIPTION OF EXEMPLARY EMBODIMENTS

Figure 3:
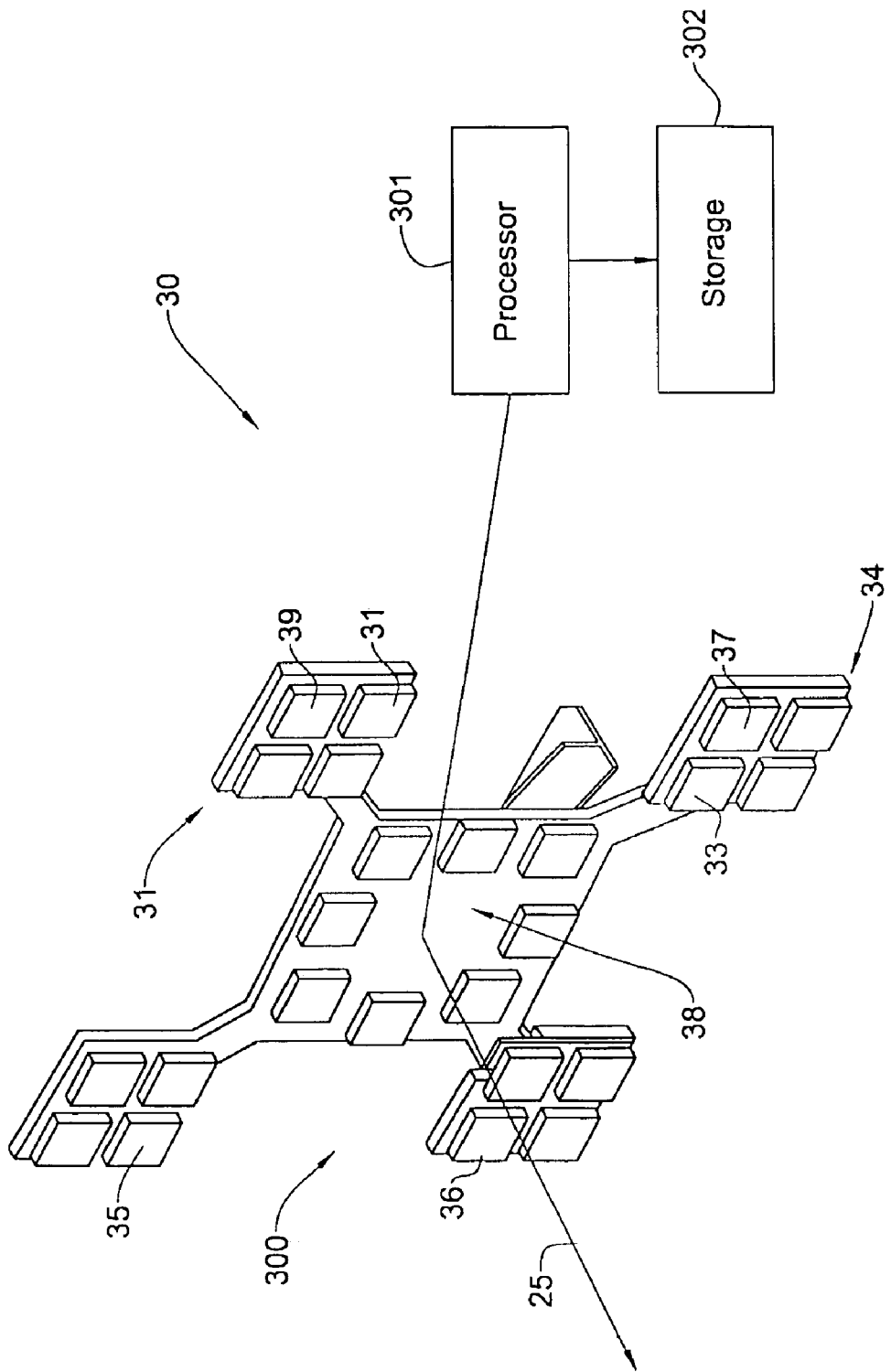
FIG. 3 is a schematic illustration of a system that includes an array of transmitters and receivers, in accordance with certain embodiments of the invention.

Unless specifically stated otherwise, as apparent from the following discussions, it is appreciated that throughout the specification discussions, utilizing terms such as, "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, computer, apparatus, system, sub-system, module, unit, device (in single or plural form) for performing the operations herein. This may be specially constructed for the desired purposes, or it may comprise a general purpose computer selectively activated or reconfigured by a computer program stored in the computer. Such a computer program may be stored in a computer readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed via a computer system bus.

The processes/devices (or counterpart terms specified above) and displays presented herein are not inherently related to any particular computer or other apparatus, unless specifically stated otherwise. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Note also that terms transmitter and Tx are used interchangeably. Note also that the terms receiver and Rx are used interchangeably. Transmitter, receiver and transceiver are each referred to also as Radio Frequency (RF) unit.

Bearing this in mind, attention is first drawn to FIG. 1, illustrating a general sequence of operation, in accordance with certain embodiments of the invention.

In accordance with certain embodiments, initial internal delays of the transmitters and receivers are provided (11) and stored for further use. The provision of initial internal delays can be realized by calculation thereof (e.g. in pre-defined laboratory conditions), as will be explained in greater detail with reference to FIG. 4, below. In accordance with certain embodiments, the initial internal delays may be received from an external source, e.g. as manufacturing specification data of the transmitters/receivers.

In accordance with certain embodiments, a so-called initial direct signals' time of arrival (14) is provided and stored for later use, as will be explained in greater detail below.

The internal delays of the transmitters and receivers may vary over time, in accordance with certain embodiments, inter alia, for at least one of the following factors:

Temperature—Various types of transmitters and receivers contain electronic hardware whose timing response is sensitive to ambient temperature, especially for Ultra-Wide-Band applications which require accuracy of, say, picoseconds.

Supply Voltage—The same hardware is often sensitive to supply voltage as well, and as a result there could be timing offsets.

In a radar application, when using transmitters/receivers for determining location of an object of interest, it is required to calculate in real-time the internal delays of the transmitters and receiver and to consider them when calculating the real-time location of the object.

Thus, the internal delays of the receivers/transmitters are calculated in real-time (12) based, among other factors, on the changes from initial internal delays. In accordance with certain embodiments, this requires calculation of real-time direct signals' time of arrivals (15) and based on the initial (14) and real-time (15) time of arrivals, a change of time of arrivals can be calculated (16). The latter, together with initial internal delays, facilitates the calculation of specified real-time delays.

Having determined the real-time internal delays of the receivers/transmitters, a real-time location of the object can be calculated (13).

Consider the following simplified scenario illustrated schematically in FIG. 2. Assume that it is required to determine in real-time the location of object (20). FIG. 2 illustrates, for simplicity, two RF units, one transmitter (21) and one receiver (22). A signal is transmitted from the transmitter (21) and travels to the object (20) and therefrom reflected towards the receiver (22) (referred to as a reflected signal that travels through indirect link (23)). As is well known, the object's location can be determined according to the travel time of the signal, such that the longer the travel time, the more distant is the object relative to the Tx/Rx system. The total travel time of the signal $D_{measured}$ along the indirect link is not only dependent on the actual travel time of the signal in the space $D_{sp}$, but also on the time delay of the signal at the transmitter 21 ($D_{Tx}$) and the time delay of the signal at the receiver 22 ($D_{Rx}$). The sought $D_{sp}$ complies, thus, with the following equation:

$$D_{sp}=D_{measured}-D_{Tx}-D_{Rx}. \quad (1)$$

As specified above, the internal time delays vary over time and therefore initial internal delays $D_{Tx}$ and $D_{Rx}$ that are provided by the manufacturer (or, say, calculated at a given timing) are likely to vary when the system is actually used (at a later stage) for determining the real time location of the object 20. It is therefore required to determine the real-time internal delays $D_{Tx}'$ and $D_{Rx}'$ of the transmitter and receiver. Thus when it is actually required to determine the object location (in real time), $D_{sp}'$ will comply with the equation:

$$D_{sp}'=D_{measured}'-D_{Tx}'-D_{Rx}' \quad (2)$$

wherein the ' signifies that all the delays were calculated in real-time.

Note, incidentally, that the internal delays of the RF units can be provided (namely received or calculated) per unit (say, $D_{Tx}$ for the transmitter 21 and $D_{Rx}$ for the receiver 22), or in accordance with another example, the internal delays of the RF units can be provided per link, e.g. the cumulative internal delays of the transmitter and receiver for link 23—$D_{Tx}+D_{Rx}$).

In accordance with certain embodiments, a direct link 24 between the transmitter and receiver is used for calculating the real-time internal delays—$D_{Tx}'$–$D_{Rx}'$. Thus, at the initial stage, a direct signal (e.g. having substantial side lobe component) is transmitted from transmitter 21 (through direct link 24) and the (initial) time of arrival of the direct signal along the direct link is stored. In accordance with a certain embodiment, time of arrival signifies the duration/timing of travel of the signal from the transmitter to the receiver. Later, when the real-time location of the object needs to be determined (using the indirect link) another session takes place wherein a direct signal (e.g. having substantial side lobe component) is transmitted again from transmitter 21 and the (real-time) time of arrival along the direct link is stored. As will be noted from the description below, the change of the time of arrivals (between the initial and real time terms) signifies the change of internal delays of the transmitter/receiver. Now based on the initial internal delays (e.g. $D_{Tx}$, $D_{Rx}$) and the specified calculated change in time delays, the real-time $D_{Tx}'$ and $D_{Rx}'$ internal delays can be determined and used for obtaining the $D_{sp}'$ (e.g. in compliance with equation (2) above), and therefrom the object location, all as will be explained in greater detail below.

Note that the direct signal does not necessarily require a significant side lobe component. Thus, in accordance with certain other embodiments, the signal has a substantial main lobe component (directed towards the object 20)) and lesser significant side lobe component (directed to link 24), however, the intensity of the latter signal is sufficient to be detected by the receiver (21) thereby constituting the direct signal which is used in the initial phase and the real-time phase, all as described above.

Note also that the specified equations (1) and (2), are provided for convenience only, and are by no means binding.

Note that for simplicity FIG. 2 depicted one transmitter and one receiver, but, as is well known in the art, in many applications, a plurality of transmitters and receivers is used for calculating the location an object.

Those versed in the art will readily appreciate that the object or objects can be stationary or moving and may or may not have direct Line of Sight (LOS) with the radar system. For instance, there may be scenarios that there is an obstacle, for instance a wall that interferes with the LOS from the radar system to the object/objects (referred to occasionally also as "through the wall vision"). Note also that in certain embodiments, (e.g. radar system with an antenna array and a plurality of receive transmit channels) the location of the object needs to be determined with very high precision, for example, in the order of millimeters. As is generally known per se this may require using Ultra-wide-Band signals for through-the-wall imaging.

As specified above, internal delays in the receivers/transmitters may adversely affect the resulting calculating of the object's location and, accordingly, these delays must be taken into account, in particular when high precision measurement is required. As further stated above, the internal delays vary over time (due to, e.g. variable temperature conditions) and accordingly for real time determination of object location (in particular when high precision is required) the current (real-time) internal delays should be calculated and taken into account in the determination of the real-time object's location.

Bearing this in mind, attention is drawn to FIG. 3 illustrating schematically a system (30) that includes a plenary array of transmitters and receivers (300), in accordance with certain embodiments of the invention.

As shown, the array of transmitters and receivers is coupled to a processor unit (301) which in turn is coupled to storage (302) constituting a computer system in accordance with an embodiment of the invention. Note that the geometric relations between the transmitters and the receivers in the array 300 is retained and is invariable during the initial stage and in the later real-time stage.

Those versed in the art will readily appreciate that the invention is not bound by plenary arrangement and accordingly other geometric arrangements are applicable as long as the geometric relation between the RF units in the array is retained substantially invariable in the initial (calibration) stage and the later real time stage.

By this embodiment, a transmitter (of the array 20) is located at the outer part 31 of the top-right wing 32 of the array 300, while a receiver is located in the inner part 33 of the lower-right wing 34. By this embodiment, both transmitter and receiver antennas have a directivity toward the front of the array (i.e. toward Z plane 35) and a signal transmitted in the direction of the antenna generates a signal in the Z axis 35 (the signal having substantial main lobe component, all as known per se. As is also known, there is still some remaining side gain (for instance pointed, it substantially 90 degrees the X-Y plane of the array). The latter gain is referred to as side-lobe component (constituting an example of direct signal). As specified above, in accordance with certain other embodiments, the transmitted signal may have a significant side lobe component compared to the main lobe component (if any).

FIG. 3 further illustrates a direct Tx-Rx link (39) between the transmitter (Tx) 31 and the receiver (Rx) 33 signifying a transmitted direct signal (originating from the transmitter 31) and received at Rx 33.

By this specific example, the array 300 includes four transmitters (31, 35, 36 and 37 disposed in the respective four wings) and twenty receivers disposed as follows: 3 receivers in each wing and 8 receivers at the center part 38 of the array. Note also that although not shown in FIG. 3, there are 80 Tx-Rx possible links (20 Rx's times 4 Tx's).

The arrangement of FIG. 3 includes a plurality of transmitters and receivers. As is generally known per se, a single transmitter/receiver will be able to determine only the range of a reflecting object. In order to obtain three-dimensional location data of the objects, more transmitters and receivers are required. Generally speaking, the higher the number of the transmitters/receivers, the higher the precision of the object's location data.

Those versed in the art will readily appreciate that the invention is not bound by the array architecture, the number of transmitters, and that the number of receivers which are provided in FIG. 3 is for illustrative purposes only. The invention is likewise not bound by any other design considerations, such as the specific architecture of the computer system (including processor storage) depicted in FIG. 3.

It should be further noted that the structure of transmitters and receivers used in a radar system is generally known per se and is not expounded upon herein. In accordance with certain embodiments, the transmitters/receivers have wideband pulses with higher transmit/receive resolution than the desired precision of the object's location.

Bearing all this in mind, there follows a description of the calculation of the initial internal delays (and initial time of arrivals) as well the real-time internal delays (using also the real-time time of arrivals) in the multi transmitter/receiver embodiments of FIG. 3.

Figure 4:
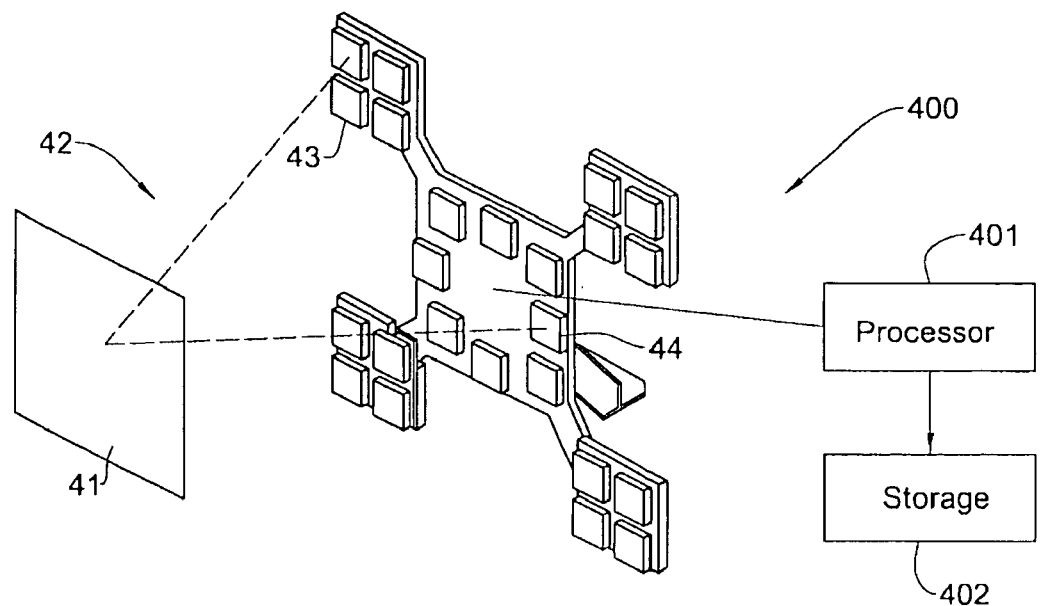
FIG. 4 is a schematic illustration of a system that includes an array of transmitters and receivers used for determining initial internal delays, in accordance with certain embodiments of the invention.

At the onset (with reference to FIG. 4) there is a need to calculate (using array 400, processor 401 and storage 402) 24 initial internal delays for 4 transmitters and 20 receivers (11 in FIG. 1). In order to calculate the initial delays (in the calibration stage) a reference object having a known simple (or relatively simple) characteristic is selected. By way of non-limiting example, a metal plate 41 serves as a reference reflecting object. It is noted that the invention is by no means bound by the use of this metal plate as a reference reflecting object. Also shown in FIG. 4, is an indirect link 42 signifying a signal (hereinafter reflected signal) that is transmitted from transmitter 43 to the object 41 and reflected back towards receiver 44. Whilst not shown in FIG. 4, there are 80 indirect links (covering all indirect Tx-Rx combinations of 4 transmitters and 20 receivers). The procedure described below for calculating the initial internal delays for the transmitters/receivers is performed at fixed and known prevailing conditions, such as temperature (e.g. 25 degrees) and supply voltage (e.g. batteries in fully charged state).

At the onset, the metal plate 41 is located at close distance to the array 400. The distance and orientation of this plate is unknown and is calculated during the calibration process. Note that in the case that the distance and orientation of the reference object (relative to the array) is known at the desired level or accuracy, the need to determine these data is of course obviated.

Next, the transmitters are configured by the computer system to transmit a lobe signal from each transmitter and reflected back from the plate 41 and received at the receivers. The computer system configures the receivers to receive the transmitted signals. Each signal was initiated from a specific transmitter, reflected from the plate 41 and received in a specific receiver, giving rise to a specific indirect link (42) per receiver and transmitter and altogether 80 different indirect links (not shown in FIG. 4). Each of these reflected signals (traveling in a respective indirect link) has a different path, and different timing. As will be shown below, for several transmitters and receivers it can be shown that there is enough information to calculate all the unknown parameters including the distance and orientation of the plate 31 as well as the initial internal delay of each transmitter and receiver.

For convenience, a single transmitter is chosen to have "zero" delay, thus all the other transmitters and receivers timing will be calculated with respect to this transmitter. This assumption of "zero delay" facilitates to check system performance as well as to average results, however the zero delay is not obligatory.

For example, consider 80 channels (20 Rx and 4 Tx units), giving rise to 80 equations.

There are 23 unknown internal delay variables (the $24^{th}$ having zero delay), namely Tx2-Tx4 (altogether 3 transmitters) and Rx1-Rx20 (altogether 20 receivers). Additionally, the distance D and orientation ($\theta$, $\phi$ angles) of the plate 41 are unknown (additional 3 variables), giving rise to a total of 26 unknown variables.

In accordance with certain embodiments, an iterative procedure is chosen to calculate these variables from the 80 channels equations.

By way of example, the iterative procedure is performed as follows:

A) Plate positioning—an orientation of the plate relative to the radar system is estimated. To this end, the three unknown variables are set to, say, arbitrary values.

B) Spatial Delay extraction—Given arbitrary selected orientation values of the plate, it is possible to calculate the spatial distance of an indirect link (i.e. Tx->Plate->Rx) for each of the 80 channels. By way of example, this can be performed by using known per se geometrical equations. The plate and two points (TX and RX) are known, and a point on the plate which creates a triangle is searched such that the angle between this points to both TX and RX shall be equal. The search is performed iteratively and the result would be the sum of both triangle edges for the spatial distance.

C) Linear equation back substitution and averaging—relative to the measured delay, it is possible to obtain 80 equations of the following type:

$$D_{RX}+D_{TX}+D_{sp}=D_{measured}$$

where $D_{RX}$ is the sought receiver's initial internal delay, $D_{TX}$ is the transmitter's initial internal delay, and $D_{sp}$ is the three-dimensional spatial delay of the Tx-Rx indirect link (a summation of the distance between the transmitter and the object, and the distance between the object and the receiver).

It can be shown that the orientation of the plate has a single optimum position with respect to minimum measurement error, hence by iterative repositioning of the plate at an orientation and distance where the measurement error tends to decrease, a minimum is reached, and eventually the delays are extracted as well as the distance and orientation of the plate.

The foregoing description explained how to calculate (during calibration stage) the initial delays of the transmitters and the receiver, using a reference object. As specified above, the delays may vary when determining a location of an object of interest during real-time operation. In order to determine the delay variations (and consequently determine the real-time delays), direct signals transmitted from the transmitters to the receivers are used (at the calibration stage—substantially at the same timing that the initial delays were calculated and later at the real-time stage) in a manner that will be described in a greater detail below.

Thus, having calculated and stored (in storage 302) the initial internal delays under predefined conditions, there follows a description of using direct signals during the calibration stage. More specifically the initial direct signals time of arrivals is determined. (14 in FIG. 1) To this end, the transmitters transmitting in the direct link direct signals (having, for example, a substantial side lobe component) and the receiver receive the specified signal. As will be explained in greater detail below, it may be required, in accordance with certain embodiments, to configure the transmitters.

Reverting to the example of FIG. 3, there are 80 direct links and, accordingly, time of arrival of the direct signal in each direct link is recorded (all with reference to given prevailing conditions, say 25 degrees and batteries in fully charged state). In accordance with certain embodiments, time of arrival may signify the time that the signal was received by the receiver. In accordance with certain other embodiments, time of arrival can signify the duration that the side lobe signal traveled through the direct link from the transmitter to the receiver.

There follows a description of calculating the initial time of arrivals, in accordance with an embodiment of the invention.

In accordance with certain embodiments, peak detection or envelope detection or other known per se techniques are used. For convenience there follows a description of an envelope detection operation followed by an Early-Late Estimation block.

Figure 5:
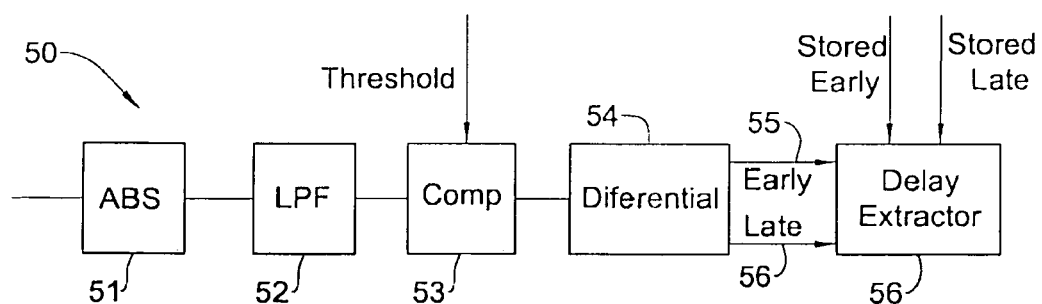
FIG. 5 illustrates a block diagram circuitry for calculating r time of arrival, in accordance with an embodiment of the invention.
Figure 6A:
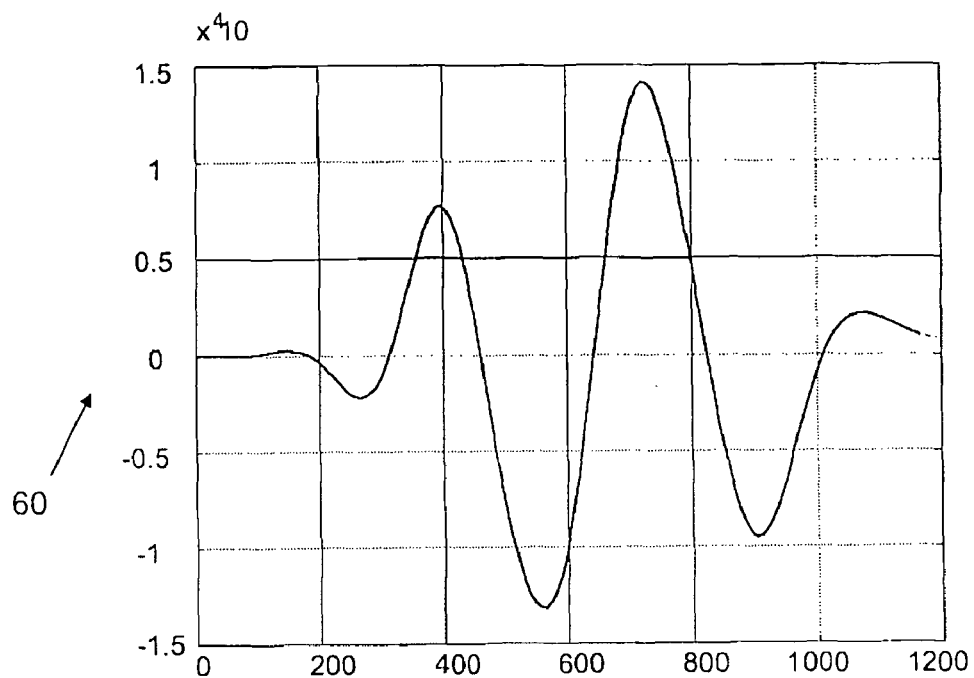
FIGS. 6A-B illustrate schematically two signal waveforms sampled at selected points in the circuitry of FIG. 5.
Figure 6B:
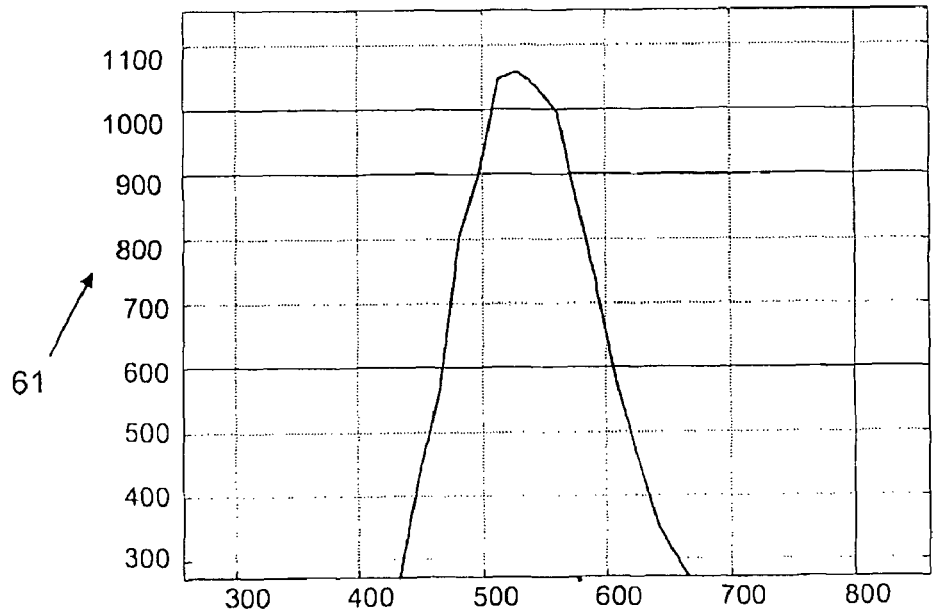

Turning at first to FIG. 5, it illustrates a block diagram circuitry (50) for calculating time of arrival, in accordance with an embodiment of the invention. Assume that a radar time-domain pulse is received at the receiver input. An example of a such known per se signal (60) is depicted in FIG. 6A. Signal (60) is fed to an absolute module (51), that is followed by an LPF module (52) which smoothes the signal, and creates a signal (61) of the kind depicted in FIG. 6B.

Then the signal is compared (53) to a threshold, which detects a rising and a falling edge (the samples where the signals were crossing the threshold value). These edges are detected by a differential module (54) which e.g. performs XOR operation for any two consecutive samples. In accordance with certain embodiments, the threshold is high enough to overcome noise and small signals, and low enough to allow signal decrease (due to temperature/Voltage effects). An exemplary threshold level can be 2-3 dB below the peak.

The rising edge sample shall be the "Early" indicator (55), and the falling edge shall be the "Late" indicator (60).

The invention is not bound by the specified envelope detection and a fortiori not by the specific circuitry and waveforms of FIGS. 5 and 6.

Having finalized the initial (calibration) phase and stored the internal delays and time of arrivals, there commences a real-time phase in which the location of the object is determined.

In operation (in real-time determination of the object's location) it is required to determine the time of arrivals of the direct signals (15 of FIG. 1), and then determine the changes in time of arrivals (compared to those determined during the calibration stage, see 16 of FIG. 1) and based also on the initial internal delays, determine the sought real-time internal delay (12 of FIG. 1).

As may be recalled, the internal delays vary over time (due to, e.g. variable temperature conditions) and accordingly for real time determination of object location (in particular when high precision is required) the current (real-time) internal delays should be calculated and taken into account in the determination of the real-time object's location.

Reverting to the example of FIG. 3, suppose that there is a stored list of say 80 (initial) time-of arrival values for each of the 80 TX-RX direct links. Now, in real-time the current time-of arrival values for each of the 80 TX-RX direct links are calculated (using, e.g. the circuitry described above with reference to FIGS. 5 and 6).

In accordance with certain embodiments, the current time of arrival values of each direct link are compared respective stored values, giving rise to change in direct signals' time of arrivals.

More specifically, and as shown in FIG. 5, in accordance with certain embodiments, for each direct link both "Early" and "Late" values are compared to the respective stored "Early" and "Late" from the initial Phase (56). The current Early is compared with the stored Early, and get the estimated "Early drift" (Early change). The same is performed to obtain the "Late drift" (Late Change). The total drift is the average of both drifts, giving rise to a single change value per direct link.

The invention is not bound by the use of only two comparison values (early and late) and obviously not by the average operator.

As was explained earlier, in accordance with certain embodiments, the initial calibration phase extracts a specific delay for each direct link. This (initial) delay is subtracted from each indirect link to get all the links to be lined up. This has been demonstrated schematically in equation (1) above, where for each indirect link the corresponding $D_{Tx}$ and $D_{Rx}$ (initial) internal delays were neutralized.

Now, after having determined the change say $\Delta$ in time of arrival for a given direct link the corresponding (real-time) internal delay for this direct link can be determined. For instance: $D_{Tx}+D_{Rx}+\Delta$. The latter equation may be regarded also as $D_{Tx}'+D_{Rx}'=D_{Tx}+D_{Rx}+\Delta$. Note that $D_{Tx}'$, $D_{Rx}'$ are the real-time internal delays for the transmitter and receiver of this particular direct link. The real-time internal delays can be provided separately (i.e. two distinct values $D_{Tx'}$, $D_{Rx'}$), or, in accordance with certain embodiments as a combined value, say $D_{Tx'}+D_{Rx'}$ for both the transmitter and receiver.

As in the initial phase, this (real-time) delay is subtracted from each indirect link to get all the links to be lined up. This has been demonstrated schematically in equation (2) above, where for each indirect link the corresponding $D_{Tx'}$ and $D_{Rx'}$ (real-time) internal delays were neutralized.

In the specific case of having all 80 links, the change for each link can be calculated. But there may be some links whose direct links are blocked (especially for a planar system with dense receivers and transmitters). For these blocked links it is possible to calculate the delay change without observing the change in time of arrival of the specified blocked direct link. Actually it is possible to calculate the delay of these blocked links based on the change estimated in other links as long as they share receivers and transmitters.

For example, assume that the real-time delays for TX1-RX1 (link #1), TX2-RX1, (link #21), and TX2-RX17 (link #37) is known (calculated). Now, the real-time delay for TX1-RX17 (link #17) can be calculated from the known delays by a simple add/subtract computation:

Delay(link #1)=Delay($TX$1)+Delay($RX$1);

Delay(link #21)=Delay($TX$2)+Delay($RX$1);

Delay(link #37)=Delay($TX$2)+Delay($RX$17);

Delay(link #17)=Delay(channel 1)−Delay(channel 21)+Delay(channel 37);

Note that by this embodiment the combined delay of the transmitter and receiver per link (e.g. link #17) were calculated rather than the distinct values for the transmitter and the receiver separately.

Note also that only 24 links (rather than 80) are required to get the entire 24 delays (for the 20 receivers and 4 transmitters). However, due to estimation errors, the redundancy in number of channels is utilized.

For example, by observing the remaining equations, it is possible to determine measurement errors (e.g. due to wrong placement of the plate). Averaging these errors we get an error value for the plate positioning. Assuming for example that the receiver R17 "participates" in four equations (describing four links each in respect of a different one of the existing four transmitters), it may well be the case that the "delay" calculated for R17 is different for each one of four links. A non-limiting manner for compensating for these errors would be to average the four results in order to obtain the calculated delay for R17.

In accordance with certain embodiments, the number of RF links is determined such that each one of said RF units forms part of at least one link. For example, in the case of 24 units, there would be at least 24 links. In accordance with a certain embodiment, the number of links are selected from a maximum number of available communication links (by the latter example 80) according to selection criterion, e.g. according to quality of received signal.

In accordance with certain embodiments of the invention a continuous system operation is retained. In accordance with certain scenarios, for calibration purposes the system's normal operation is stopped and a calibration process for neutralizing real-time internal delays is applied. To this end, the RF units are configured to operate in an indirect lobe mode wherein said transmitters are configured to transmit signals that include substantial main lobe components and the receivers are configured to receive signals that include substantial main lobe components, and whenever direct mode is required (for calculating time of arrivals), the RF units are configured to operate in a direct mode wherein the transmitters are configured to transmit signals that include substantial side lobe components and the receivers are configured to receive signals that include substantial side lobe components.

In accordance with certain other embodiments, the system operates normally (and does not require switching from "indirect" to "direct" modes and vice versa) such that the energy transmitted and received encompasses sufficient energy for both the reflected and direct signals. The latter mode is normally at the penalty of adversely affecting the system's efficiency for determining the object's location (e.g. reduced maximal range). Note that usually, the area of interest (i.e. object's location) does not contain the direct link time of arrival (which is very short relative to reflecting objects time of arrival), hence by extending the range of observation of the transmitter and receivers to include also direct link (e.g. side lobes), valuable time is wasted which can be used otherwise (e.g., for increased range of interest or signal to noise ratio increase). Time is inevitably lost when normal operation of the system is stopped and calibration is applied.

Both options are possible, and a decision is made for instance based on the rate of the required calibration, compared to the time it takes to calibrate when the system is in calibration mode and the marginal time added to account for range increase, all depending upon the particular application.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The present invention has been described with a certain degree of particularity, but those versed in the art will readily appreciate that various alterations and modifications may be carried out, without departing from the scope of the following Claims:

The invention claimed is:

1. In a system that includes RF units that include at least one transmitter and at least one receiver, a method for determining real-time location of a reflecting object with the help of at least one operational signal transmitted via an operational link between certain RF units, the method comprising:
   (a) providing initial direct signals' time of arrival characterizing direct link between said certain RF units, and providing initial internal delays of said certain RF
   (b) transmitting direct signal via said direct link between said certain RF units, and measuring real-time direct signal's time of arrival characterizing said direct link;
   (c) the transmitter transmitting signals towards the object and the receiver receiving at least one signal reflected from the object, thus giving rise to the operational signal transmitted via the operational link; and measuring reflected signals' time of arrivals;
   (d) calculating real-time relative internal delay of said operational link, said calculating based on the measured real-time direct signals' time of arrivals, initial direct signals' time of arrivals and initial internal delays of said certain RF units; and
   (e) determining the real-time location of the object based on the reflected signals' time of arrivals and the real-time relative internal delay of the operational link, wherein said operational signal and said direct signal are constituted by different lobe components of a same signal transmitted between said certain RF units, and wherein determining real-time location of a reflecting object is provided with the help of a plurality of operational signals transmitted via a plurality of operational links between respective RF units, wherein real-time relative internal delays are calculated separately for each operational link among said plurality of operational links, said calculations providing based on real-time direct signals' time of arrival, initial direct signals' time of arrival and initial internal delays of RF units corresponding to each respective link.

2. The method according to claim 1, wherein said direct signal is constituted by a main lobe component, and the operational signal is constituted, at least, by a substantial side lobe components of the signal transmitted between said certain RF units.

3. The method according to claim 1, wherein the internal delays of the RF unit are changed in response to change in at least one of the following:
(a) ambient temperature, and
(b) voltage supplied to the RF unit.

4. The method according to claim 1, wherein said providing initial signals' time of arrivals includes each transmitter transmitting an initial direct signal and measuring initial direct signal's time of arrivals of the respective direct links.

5. The method according to claim 1, wherein a number of operational links in said plurality of operational links is selected from a maximum number of available communication links according to selection criterion that includes quality of received signal.

6. The method according to claim 1, wherein said internal delays of the RF units include a delay per RF unit.

7. The method according to claim 1, wherein said operational signal is designated for determining real-time location of a reflecting object.

8. The method according to claim 1, wherein the initial delays of RF units are provided by measuring, using a reference object, respective initial delays of a part of RF units, thus giving rise to measured initial delays; and by calculating initial delays of the rest of RF units, such calculations based on said measured initial delays of said part of RF units.

9. A system for determining real-time location of a reflecting object, the system comprising:
RF units consisting of at least one receiver and at least one transmitter, and a computer system including storage coupled to the RF units;
wherein:
(a) the system is configured to determine the real-time location with the help of at least one operational signal transmitted via an operational link between certain RF units;
(b) the computer system is configured to provide initial and real-time direct signals' time of arrival characterizing a direct link between said certain RF units and initial internal delays of said certain RF units; and
(c) the computer system is configured to calculate real-time relative internal delay of said operational link between said certain RF units, said calculation based on the real-time direct signals' time of arrival, initial direct signals' time of arrival and initial internal delays of said certain RF units,
wherein said operational signal and said direct signal are constituted by different lobe components of a same signal transmitted between said certain RF units, and wherein determining real-time location of a reflecting object is provided with the help of a plurality of operational signals transmitted via a plurality of operational links between respective RF units, wherein real-time relative internal delays are calculated separately for each operational link among said plurality of operational links, said calculations providing based on real-time direct signals' time of arrival, initial direct signals' time of arrival and initial internal delays of RF units corresponding to each respective link.

10. In a system that includes RF units that include at least one transmitter and at least one receiver, a non-transitory computer readable medium storing a computer readable program executable by a computer for causing the computer to perform a process for determining real-time location of a reflecting object with the help of at least one operational signal transmitted via an operational link between certain RF units, the process comprising:
(a) providing an initial direct signals' time of arrival, characterizing a direct link between said certain RF units, and providing initial internal delays of said certain RF units;
(b) transmitting a direct signal via said direct link, and measuring in said direct link real-time direct signal's time of arrival;
(c) the transmitter transmitting signals towards the object and the receiver receiving at least one signal signals reflected from the object, thus giving rise to the operational signal transmitted via the operational link, and measuring reflected signals' time of arrivals;
(d) calculating real-time relative change of internal delay of said operational link between said certain RF units, said calculating based on the measured real-time direct signals' time of arrival, initial direct signal's time of arrival and said initial internal delays of said certain RF units; and
(e) determining the real-time location of the object based on the reflected signals' time of arrivals and the real-time relative internal delay of the operational link,
wherein said operational signal and direct signal are constituted by different lobe components of a same signal transmitted between said certain RF units, and
wherein determining real-time location of a reflecting object is provided with a plurality of operational signals transmitted via a plurality of operational links between respective RF units, wherein real-time relative internal delays are calculated separately for each operational link among said plurality of operational links, said calculations providing based on real-time direct signals' time of arrival, initial direct signals' time of arrival and initial internal delays of RF units corresponding to each respective link.

11. In a system that includes RF units that include at least one transmitter and at least one receiver, a computer program product comprising a non-transitory computer readable medium storing computer readable program code for causing a computer to determine real-time location of a reflecting object with the help of at least one operational signal transmitted via an operational link between certain RF units, the computer program product comprising:
(a) computer readable program code for causing the computer to provide initial direct signals' time of arrival characterizing direct link between said certain RF units, and providing initial internal delays of said certain RF units;
(b) computer readable program code for causing the computer to transmit direct signal via said direct link between said certain RF units, and measuring real-time direct signal's time of arrival characterizing said direct link;
(c) computer readable program code for causing the computer to the transmitter transmitting signals towards the object and the receiver receiving at least one signal reflected from the object, thus giving rise to the operational signal transmitted via the operational link; and measuring reflected signals' time of arrivals;
(d) computer readable program code for causing the computer to calculate real-time relative internal delay of said operational link, said calculating based on the measured real-time direct signals' time of arrivals, initial direct signals' time of arrivals and initial internal delays of said certain RF units; and
(e) computer readable program code for causing the computer to determine the real-time location of the object based on the reflected signals' time of arrivals and the real-time relative internal delay of the operational link, wherein said operational signal and said direct signal are constituted by different lobe components of a same signal transmitted between said certain RF units, and wherein determining real-time location of a reflecting object is provided with the help of a plurality of operational signals transmitted via a plurality of operational links between respective RF units, wherein real-time relative internal delays are calculated separately for each operational link among said plurality of operational links, said calculations providing based on real-time direct signals' time of arrival, initial direct signals' time of arrival and initial internal delays of RF units corresponding to each respective link.

* * * * *